US007672957B2

(12) United States Patent
Cotichini et al.

(10) Patent No.: US 7,672,957 B2
(45) Date of Patent: Mar. 2, 2010

(54) USER INTERFACE CONFIGURED TO DISPLAY MECHANICAL FABRIC AND SEMANTIC MODEL OF A LEGACY COMPUTER APPLICATION GENERATED, GRAPHICAL VIEW NAVIGATING LINKS BETWEEN MECHANICAL NODES AND SEMANTIC NODES BASED ON RELEVANT BUSINESS RULES

(75) Inventors: Christian G. Cotichini, Vancouver (CA); Yonas Jongkind, Langley (CA)

(73) Assignee: MAKE Technologies, Inc., Vancouver (CA)

(*) Notice: Subject to any disclaimer, the term of this patent is extended or adjusted under 35 U.S.C. 154(b) by 215 days.

(21) Appl. No.: 11/674,047

(22) Filed: Feb. 12, 2007

(65) Prior Publication Data

US 2007/0245320 A1 Oct. 18, 2007

Related U.S. Application Data

(60) Provisional application No. 60/772,118, filed on Feb. 10, 2006.

(51) Int. Cl.
*G06F 17/00* (2006.01)
*G06F 17/21* (2006.01)
*G06F 3/00* (2006.01)
*G06F 9/44* (2006.01)

(52) U.S. Cl. .............. 707/100; 707/102; 707/103 Z; 715/236; 715/762; 717/116

(58) Field of Classification Search ............ 707/1–2, 707/100, 102, 103 R, 103 Y, 103 Z; 717/100–102, 717/120–121, 143, 108, 165, 104, 116; 715/205–208, 715/234–236, 239, 713, 762–763, 854
See application file for complete search history.

(56) References Cited

U.S. PATENT DOCUMENTS 6,578,195 B1 * 6/2003 Zaringhalam ............ 717/140

(Continued)

FOREIGN PATENT DOCUMENTS

WO       WO 01/14969        *  3/2001

(Continued)

OTHER PUBLICATIONS

David J. Russomanno,"Efficient Legacy Data Utilization",Expert Systems, Edited by Cornelius T. Leondes, vol. 4, 2002.*

(Continued)

*Primary Examiner*—Srirama Channavajjala
(74) *Attorney, Agent, or Firm*—Alleman Hall McCoy Russell & Tuttle LLP

(57) ABSTRACT

According to one aspect of the invention, a software transformation system is provided that may include a business asset extraction sub-system. The business asset extraction sub-system is typically configured to analyze a legacy computer application and create a mechanical fabric representing computer-implemented operations of the legacy computer application, and to create a semantic model representing operator-perceived meanings attached to interactions with the legacy application. The business asset extraction sub-system is further typically configured to create links between related portions of the mechanical fabric and the semantic model. The mechanical fabric comprises a network of nodes and associations between nodes, the nodes and associations representing one or more system interface objects, computer programs, and data access points, and a physical data model configured to store data records utilized by the legacy computer application.

11 Claims, 10 Drawing Sheets

Semantic – Mechanical Linking

U.S. PATENT DOCUMENTS

| | | |
|---|---|---|
| 6,738,967 B1 * | 5/2004 | Radigan ................. 717/146 |
| 6,757,869 B1 | 6/2004 | Li et al. |
| 6,993,745 B1 | 1/2006 | Ballantyne et al. |
| 7,099,926 B1 * | 8/2006 | Ims et al. ................. 709/217 |
| 7,467,375 B2 * | 12/2008 | Tondreau et al. ........... 717/137 |
| 2001/0042067 A1 * | 11/2001 | Dayani-Fard et al. ....... 707/102 |
| 2002/0046294 A1 * | 4/2002 | Brodsky et al. ............ 709/246 |
| 2003/0055921 A1 * | 3/2003 | Kulkarni et al. ........... 709/220 |
| 2003/0074424 A1 * | 4/2003 | Giles et al. ................ 709/219 |
| 2003/0172368 A1 * | 9/2003 | Alumbaugh et al. ........ 717/106 |
| 2003/0193521 A1 | 10/2003 | Chen et al. |
| 2003/0226132 A1 | 12/2003 | Tondreau et al. |
| 2004/0093344 A1 * | 5/2004 | Berger et al. ............... 707/102 |
| 2004/0145607 A1 * | 7/2004 | Alderson .................. 345/746 |
| 2005/0039173 A1 * | 2/2005 | Tondreau et al. ........... 717/136 |
| 2005/0071853 A1 * | 3/2005 | Jones et al. ................ 719/328 |
| 2005/0097521 A1 * | 5/2005 | Liu ........................ 717/136 |
| 2005/0138603 A1 | 6/2005 | Cha et al. |
| 2005/0154979 A1 | 7/2005 | Chidlovskii et al. |
| 2005/0240944 A1 * | 10/2005 | Stall ....................... 719/329 |
| 2007/0245297 A1 * | 10/2007 | Kuester et al. ............. 717/104 |

FOREIGN PATENT DOCUMENTS

| | | | |
|---|---|---|---|
| WO | WO 01/57651 | * | 8/2001 |
| WO | WO 02/093367 | * | 12/2002 |
| WO | WO 2004/017230 | * | 2/2004 |
| WO | WO 2005/008488 | * | 1/2005 |
| WO | WO 2007/129224 | * | 11/2007 |

OTHER PUBLICATIONS

Jiang Guo, "Software reuse through re-engineering the legacy systems"Information and Software Technology 45 (2003) 597-609.*

ISA Canada, International Search Report of PCT/IB2007/002375, Feb. 1, 2008, WIPO.

* cited by examiner

700

```
<rdf:RDF
    xmlns="http://www.maketechnologies.com/BREW/UseCase#"
    xmlns:owl="http://www.w3.org/2002/07/owl#"
    xmlns:j.0="http://www.maketechnologies.com/BREW/XSA.owl#"
    xmlns:daml="http://www.daml.org/2001/03/daml+oil#"
702 xmlns:dc="http://purl.org/dc/elements/1.1/" >
    <rdf:Description rdf:about="http://www.maketechnologies.com/BREW/UseCase#ProceduralProgram_mim720p6">    704
      <j.0:Program_name>mim720p6</j.0:Program_name>
      <rdf:type rdf:resource="http://www.maketechnologies.com/BREW/XSA.owl#ProceduralProgram"/>
    </rdf:Description>
    <rdf:Description rdf:about="http://.../BREW/UseCase#ProceduralProgram_UseCase_170_0__INTF__CPS612P1">
706   <rdf:type rdf:resource="http://www.maketechnologies.com/BREW/XSA.owl#ProceduralProgram"/>
      <j.0:Program_main_method rdf:resource="http://..._ProceduralProgram_UseCase_170_0__INTF__CPS612P1"/>
      <j.0:Program_package rdf:resource="http://www...com/BREW/UseCase#Pkg_UseCase_170_0__INTF_"/>
708   <j.0:Program_name>CPS612P1</j.0:Program_name>
    </rdf:Description>
    <rdf:Description rdf:about="http://.../BREW/UseCase#Report_cpsjr596_SPEC_MAP6_LT9C_cps596p4_cmprt01">
      <j.0:report_identifier>cpsjr596.SPEC.MAP6.LT9C.cps596p4.cmprt01</j.0:report_identifier>
      <j.0:report_programs rdf:resource="http://www.make...com/BREW/UseCase#ProceduralProgram_cps596p4"/>
      <rdf:type rdf:resource="http://www.maketechnologies.com/BREW/XSA.owl#Report"/>
710 </rdf:Description>
    <rdf:Description rdf:about="http://www.maketechnologies.com/BREW/UseCase#Batch_hisju670">
      <j.0:Batch_reports_created
    rdf:resource="http://www.make...com/BREW/UseCase#Report_hisju670_Step10_mim670p1_cmprt01"/>
      <j.0:Batch_identifier>hisju670</j.0:Batch_identifier>
      <rdf:type rdf:resource="http://www.maketechnologies.com/BREW/XSA.owl#Batch"/>
      <j.0:Batch_programs_run rdf:resource="http://www.make...com/BREW/UseCase#ProceduralProgram_Print"/>
```

| FILE: CUST | |
|---|---|
| FIELD NAME | FIELD TYPE |
| LNAME | Str(12) |
| ... | ... |
| STATE | Str(2) |
| SSN | Num(9) |

Fig. 8

USER INTERFACE CONFIGURED TO DISPLAY MECHANICAL FABRIC AND SEMANTIC MODEL OF A LEGACY COMPUTER APPLICATION GENERATED, GRAPHICAL VIEW NAVIGATING LINKS BETWEEN MECHANICAL NODES AND SEMANTIC NODES BASED ON RELEVANT BUSINESS RULES

CROSS-REFERENCE TO RELATED APPLICATIONS

This application claims the benefit of U.S. provisional application Ser. No. 60/772,118, filed on Feb. 10, 2006, and entitled LEGACY SOFTWARE MODERNIZATION SYSTEM, the disclosure of which is hereby incorporated by reference in its entirety for all purposes.

TECHNICAL FIELD

The present invention relates generally to business systems and software, and more particularly to legacy system and software modernization.

BACKGROUND

One of the greatest infrastructure challenges in organizations today is the reliance on software systems created and maintained over a period of time much longer than the anticipated lifespan. Many of these systems were created with numerous limitations and restrictions due to technological restraints of the time period. Over time, technology has rapidly improved and many of these systems have become outdated and inefficient. As a result, many organizations are looking for a viable approach to modernize their legacy systems.

Past attempts at legacy application modernization have generally included direct hardware or software updates and/or conversions. A first approach to legacy application modernization involves moving system software from old hardware to new hardware. One problem with this approach is that the flaws arising from the original restrictions and limitations built into the legacy application remain in the modernized software. This approach generally lacks analysis or improvement of the legacy software.

Another approach to legacy application modernization involves performing a line by line conversion of legacy source code into a new programming language. Although the converted legacy software may have new advantages as a result of the language conversion, obsolete or inefficient functionality may still remain in the application. This approach may improve application software, but still lacks any substantial analysis or improvement of functionality and efficiency.

Yet another approach of legacy application modernization can be to develop a completely new application. However, in most instances this approach is not viable due to extreme cost and time requirements.

SUMMARY

According to one aspect of the invention, a software transformation system is provided that may include a business asset extraction sub-system. The business asset extraction sub-system is typically configured to analyze a legacy computer application and create a mechanical fabric representing computer-implemented operations of the legacy computer application, and to create a semantic model representing operator-perceived meanings attached to interactions with the legacy application. The business asset extraction sub-system is further typically configured to create links between related portions of the mechanical fabric and the semantic model. The mechanical fabric comprises a network of nodes and associations between nodes, the nodes and associations representing one or more system interface objects, computer programs, and data access points, and a physical data model configured to store data records utilized by the legacy computer application.

According to another aspect of the invention, a software transformation system may be provided that typically includes a computer-executable transformation program including a user interface configured to display at least a portion of a mechanical fabric and a semantic model of a legacy computer application, the user interface including controls for navigating to locations within the mechanical fabric and the semantic model, and for navigating between the mechanical fabric and the semantic model along links formed therebetween.

According to another aspect of the invention, a mechanical fabric data architecture configured to represent a legacy computer application is provided, which typically includes a plurality of nodes interlinked by associations between the nodes. The nodes respectively may be configured to represent a portion of code within a computer program, a system interface object implemented by the computer program, data stored within a physical data model; and data access points interlinking the computer program and the physical data model.

According to another aspect of the invention, a semantic model data architecture is provided, which is configured to represent operator-perceived meanings attached to human interactions with the legacy computer application. The semantic model typically includes a plurality of nodes interlinked by associations between the nodes. The nodes respectively may be configured to represent at least one business process of an enterprise; use cases for each discrete task within the business process; observable system interactions with the legacy application, by which operators interact with the legacy computer application, the observable system objects being associable with one or more use cases; the legacy application; and a logical domain model representing operator-perceived data processed by the legacy application.

According to another aspect of the invention, a method of creating a mechanical fabric representing a legacy computer application is provided, which typically includes parsing the legacy computer application to identify mechanical assets of the legacy computer application. The mechanical assets may include computer programs, system interface objects of the computer programs via which human operators interact with the computer programs, a physical data model representing stored data within the legacy application, and data access points through which computer programs access data stored in the physical data model. The method may further include tagging the mechanical assets with semantic tags, creating nodes from the tagged mechanical assets, and linking the nodes to create a mechanical fabric representing computer-implemented operations of the legacy computer application, which is navigable by a user along the links.

According to another aspect of the invention, a method of creating a semantic model representing a legacy computer application is provided, which typically includes identifying semantic assets representing human interaction with the legacy computer application. The semantic assets may include business processes, use cases of the business processes, and observable system interactions corresponding to the use cases. The method may further include creating a plurality of nodes, each node representing a semantic asset and being tagged with a semantic tag, and linking the tagged nodes to thereby create a semantic model representing human interaction with the legacy computer application, which is navigable by a user along the links.

BRIEF DESCRIPTION OF DRAWINGS

The disclosure is illustrated by way of example and not by way of limitation in the figures of the accompanying drawings, in which the like references indicate similar elements and in which:

FIG. 7 is a schematic representation of a sample resource description framework file format utilized by the system of FIG. 1.

FIG. 8 illustrates an exemplary embodiment physical data model utilized by the system of FIG. 1.

DETAILED DESCRIPTION

Figure 1:
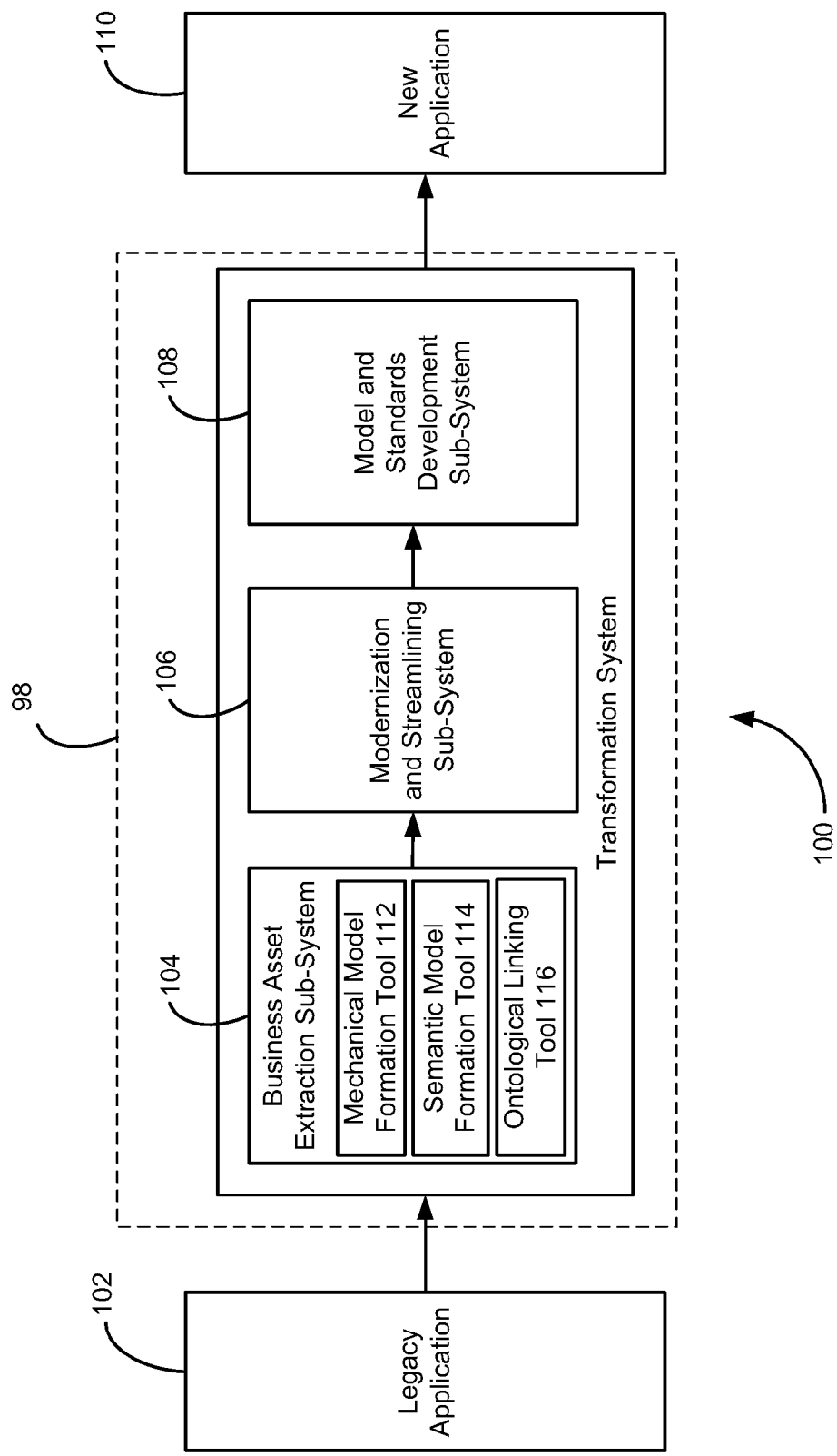
FIG. 1 is a schematic diagram of an exemplary embodiment of a transformation system.

One exemplary embodiment of a transformation system of the present invention is schematically illustrated in FIG. 1. Transformation system 100 typically includes one or more computer programs executed by a computing device 98, and is configured to be applied to legacy application 102, to thereby produce a new application 110. As used herein "application" refers to software or firmware components that may be executed by, or utilized by one or more computing devices of an organization, and is meant to encompass executable files, data files, libraries, drivers, scripts, database records, etc.

Transformation system 100 typically includes a business asset extraction sub-system 104, a modernization and streamlining sub-system 106, and a model and standards development sub-system 108. Business asset extraction sub-system 104 is configured to extract mechanical and semantic assets from the legacy application and link them together through analysis and modeling to reveal governing business rules. Modernization and streamlining sub-system 106 is configured to analyze the revealed business rules to determine if they are still necessary and/or efficient so that they may be applied to the new application. Model and standards development sub-system 108 is configured to apply model driven development techniques to create the new application.

Business asset extraction sub-system 104 is typically comprised of mechanical model formation tool 112, semantic model formation tool 114, and ontological linking tool 116. Mechanical model formation tool 112 is configured to identify, parse, and tag mechanical assets of the legacy application, to thereby produce a mechanical model (alternatively referred to as a mechanical fabric) of the legacy application. Semantic model formation tool 114 is configured to identify, parse and tag semantic assets of the legacy application, to thereby produce a semantic model (alternatively referred to as a semantic fabric) of the legacy application. Ontological linking tool 116 is configured to identify and link boundary nodes of the mechanical and semantic models. The mechanical model and semantic model produced in the business asset extraction sub-system can be used to identify business assets of the legacy application which can be used in the re-engineering process to create the new application. Mechanical model formation tool 112 can be configured to scan legacy application 102 in order to identify mechanical assets. Mechanical assets include, but are not limited to: source code, data definition files, scripts, database files, system documentation, system interface specifications, etc.

Figure 2:
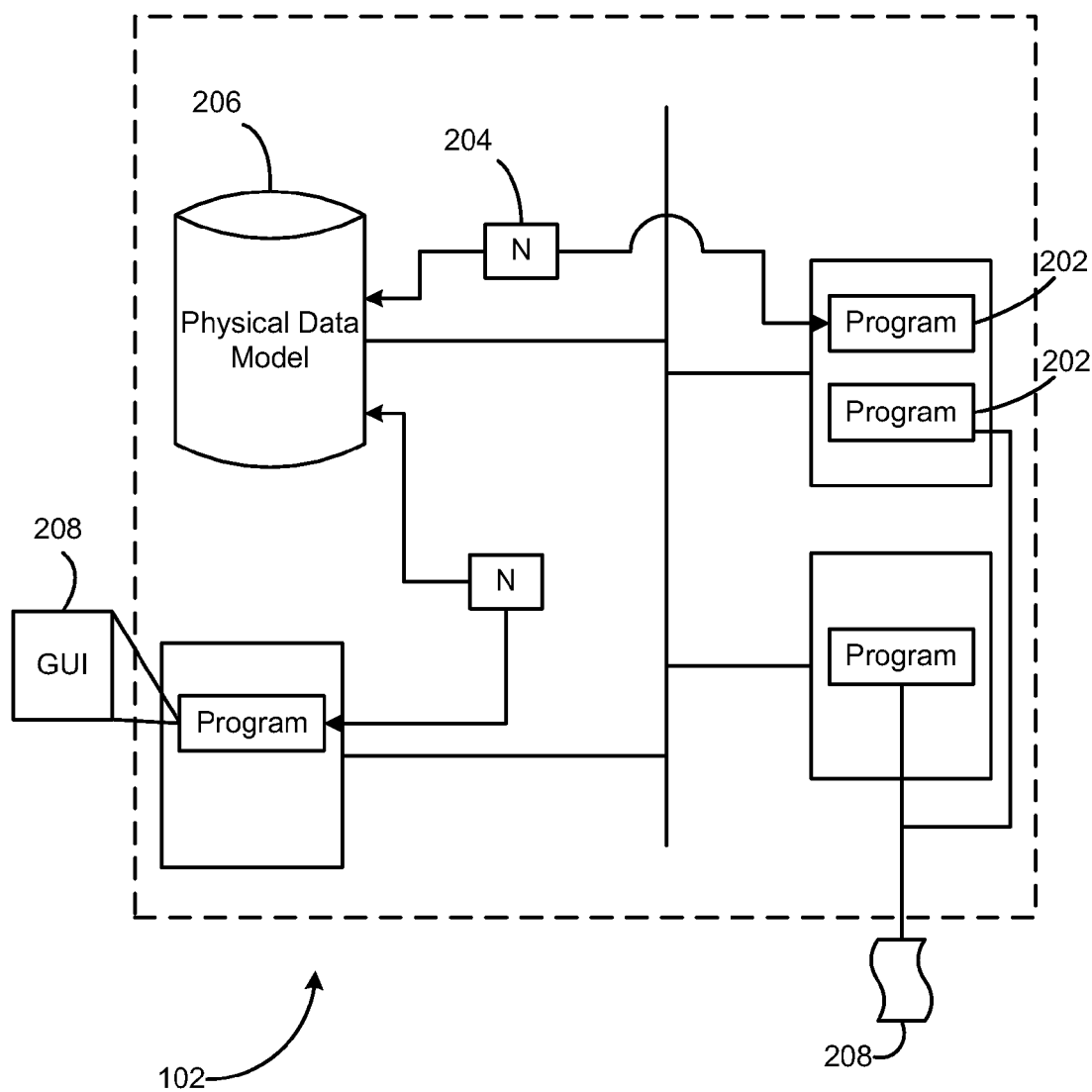
FIG. 2 is a schematic diagram of an exemplary embodiment of a legacy application of the system of FIG. 1.

Referring now to FIG. 2, the mechanical model formation tool identifies assets throughout legacy application 102. For example, a mechanical asset may include various segments of source code in the form of programs 202 and/or physical data model 206. An example physical data model 206 is illustrated in FIG. 8 and explained herein below. These mechanical assets may be integrated into system hardware throughout the legacy application. An example of program 202 may be source code that performs a task or set of tasks, such as to create a user interface or to make read/write calls to a database within legacy application 102. An example of a physical data model 206 is a database schema.

Within legacy application 102, program 202 may interact with physical data model 206 via data access point 204. A data access point may be a read or write call between a physical data model and a program in the legacy application. For example, the mechanical model formation tool can be configured to identify a data access point as a link between assets within the mechanical model.

Throughout the legacy application a program may interact with System Interface Objects (SIO) that cross the boundary between the mechanical model and the semantic model. As shown at 208, an example system interface object may be source code that can produce a human readable screen, such as a graphic user interface. Another example can be source code that prints a report, or document also shown at 208. The mechanical asset extraction tool can identify a system interface object as a link that crosses the mechanical model boundary.

Once the mechanical model formation tool has identified all of the mechanical assets, it can be configured to parse the legacy application source code into identifiable segments. During the parsing process each segment can be tagged with identifier information which can be used by the mechanical model formation tool for the purposes of mapping. After the legacy application has been parsed to identify the mechanical assets, and tagged with information, the mechanical model formation tool can be configured to assign nodes to the tagged segments. The nodes can be linked together to generate a model of the legacy application.

For example, a program 202 may perform several read/write calls via a data access point 204, which can affect information stored in a physical data model 206. All of these elements may have node assignments. Mapping of these nodes throughout the legacy application can enable information changed or produced by program 202 to be tracked throughout the legacy application. The mapping process can reveal the framework of the mechanical model. When the mapping process is completed, the mechanical model formation tool has created the mechanical model of the legacy application.

Figure 3:
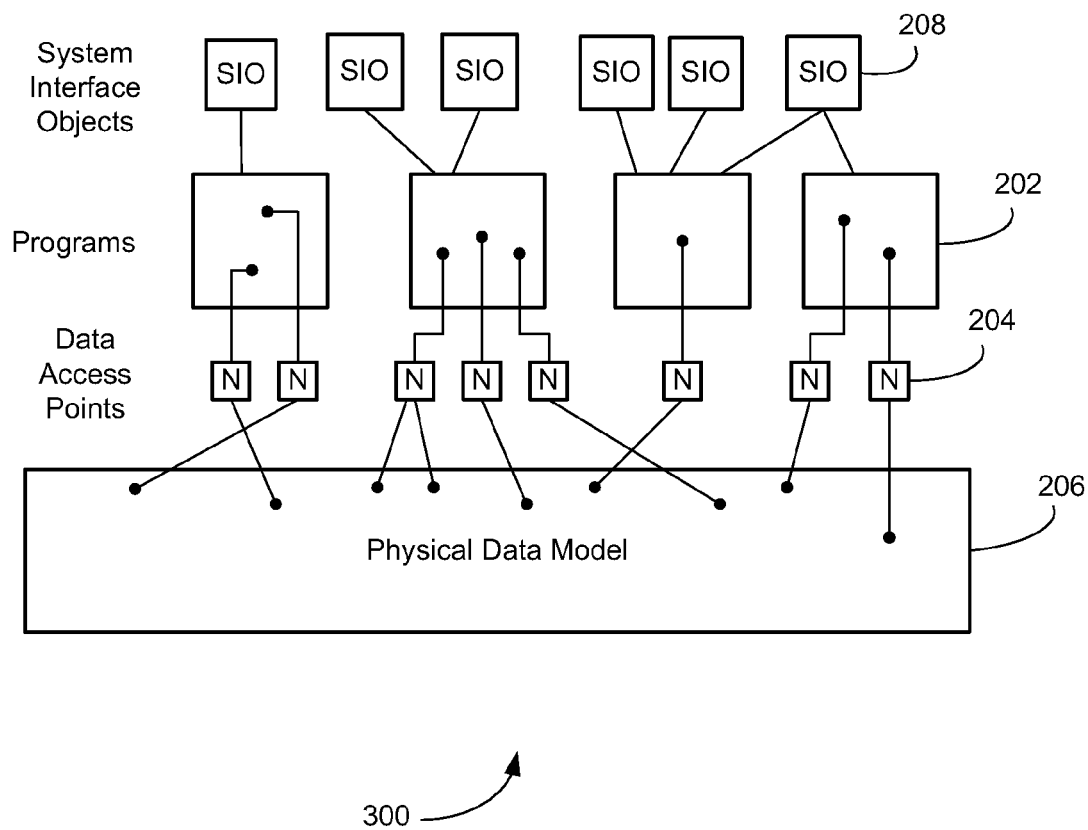
FIG. 3 is a schematic diagram of an exempalry embodiment of a mechanical model produced by the system of FIG. 1.

Now referring to FIG. 3, a schematic representation of the linking of the mechanical assets within the mechanical model is shown. Mechanical model 300 contains various example programs 202 which can be linked to physical data model 206 via data access points 204. Programs 202 may have a plurality of links to physical data model 206 through multiple data access points 204. Programs 202 may also be linked to system interface objects 208.

In some instances multiple programs may produce different portions of a single system interface object. As another example a program may produce a plurality of different system interface objects. Information and relationships related to a particular mechanical asset can be exposed in the mechanical model. The mechanical model and the semantic model can be used in combination to identify assets of the legacy application.

The semantic model formation tool can be configured to extract, parse, and tag semantic assets from the legacy application. The semantic model may contain all business assets of the legacy application that are not part of the mechanical model.

Figure 4:
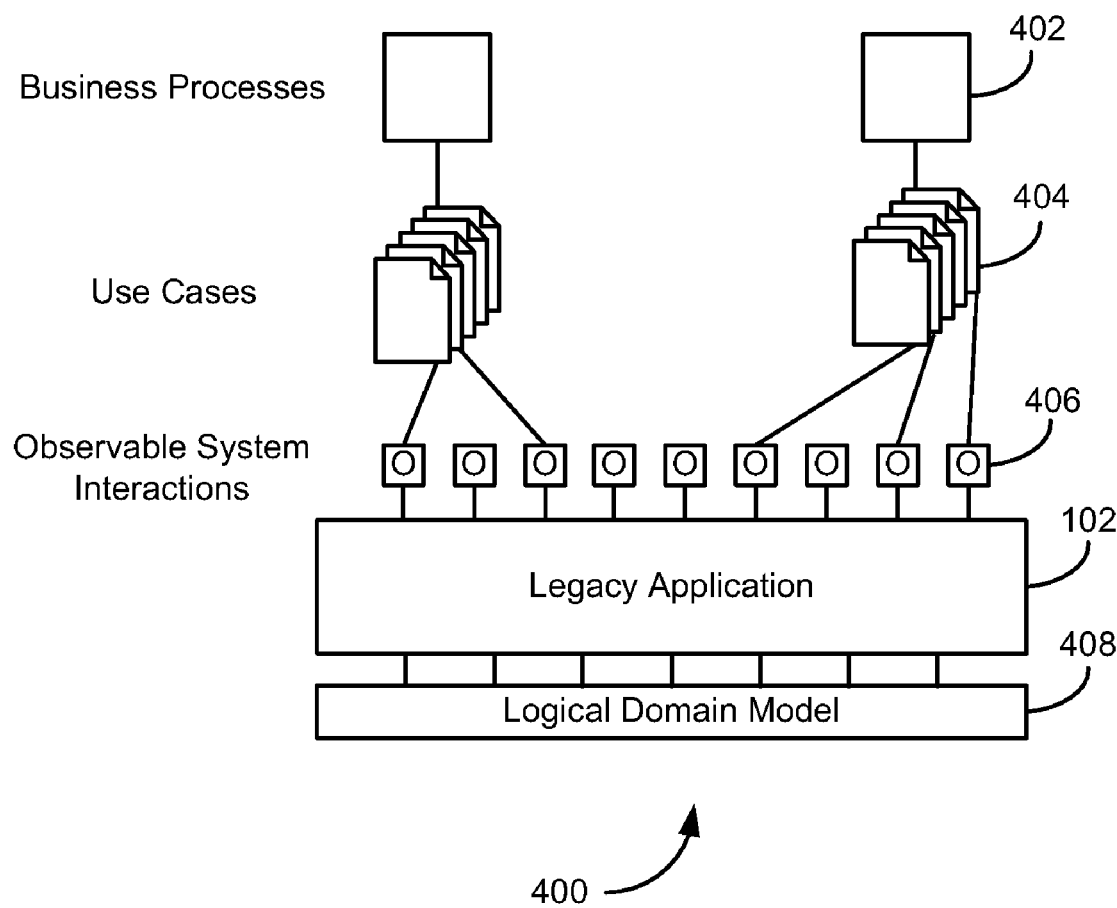
FIG. 4 is a schematic diagram of an exemplary embodiment of the semantic model produced by the system of FIG. 1.

FIG. 4 shows a schematic representation of the semantic model hierarchy. The semantic model 400 can include business processes 402, use cases 404, observable system interactions 406, and domain model 408. Elements of the semantic model can interact with elements of the mechanical model within the legacy application, but semantic elements exist independently of the mechanical model.

The semantic model formation tool starts the process of extracting semantic assets by identifying the business processes 402 conducted by the legacy application. For each business process a plurality of use cases 404 may exist. A use case can be a specific set of steps taken to complete a business process. Identified steps of a use case may be extracted in various ways including graphic modeling or video recording. An exemplary video recording may show a user interacting with a screen produced by the legacy application. During the semantic asset extraction process some use cases may already be identified while other use cases may have to be created.

Steps of a use case 404 may include observable system interactions 406. An observable system interaction may be any point where a use case employs a mechanical asset of the legacy application. An observable system interaction can cross the semantic boundary. One example of an observable system interaction is when a user uses a screen produced by a program of the legacy application to complete a step of a use case.

An observable system interaction may be used to retrieve information embedded in the mechanical model from domain model 408. The domain model can be represented as static elements mapped to dynamic data stored in the physical data model. The elements of the domain model are descriptions which can enable a user to understand and evaluate data in the physical data model. An example element of the domain model may be an invoice number or a customer name or any other description related to a business process.

Once the semantic model formation tool has identified all of the semantic assets, it can be configured to parse the assets. During the parsing process each asset can be tagged with identifier information which can be used by the semantic model formation tool for the purposes of mapping.

After the semantic assets have been parsed and tagged with information, the semantic model formation tool can be configured to assign nodes to the tagged assets. The nodes can be linked together through modeling which, in turn, can be used to generate maps of the semantic model. When the mapping process is completed, the semantic model formation tool has created the semantic model of the legacy application.

The ontological linking tool can be configured to link the mechanical model and the semantic model at a granular level. In an exemplary embodiment the linking of the mechanical and semantic models can be accomplished in a repository, such as a Present Case Analysis (PCA) repository including the assets generated in a mechanical fabric and semantic models. During the ontological linking process each model can be loaded into the PCA repository and examined to identify boundary nodes.

Figure 5:
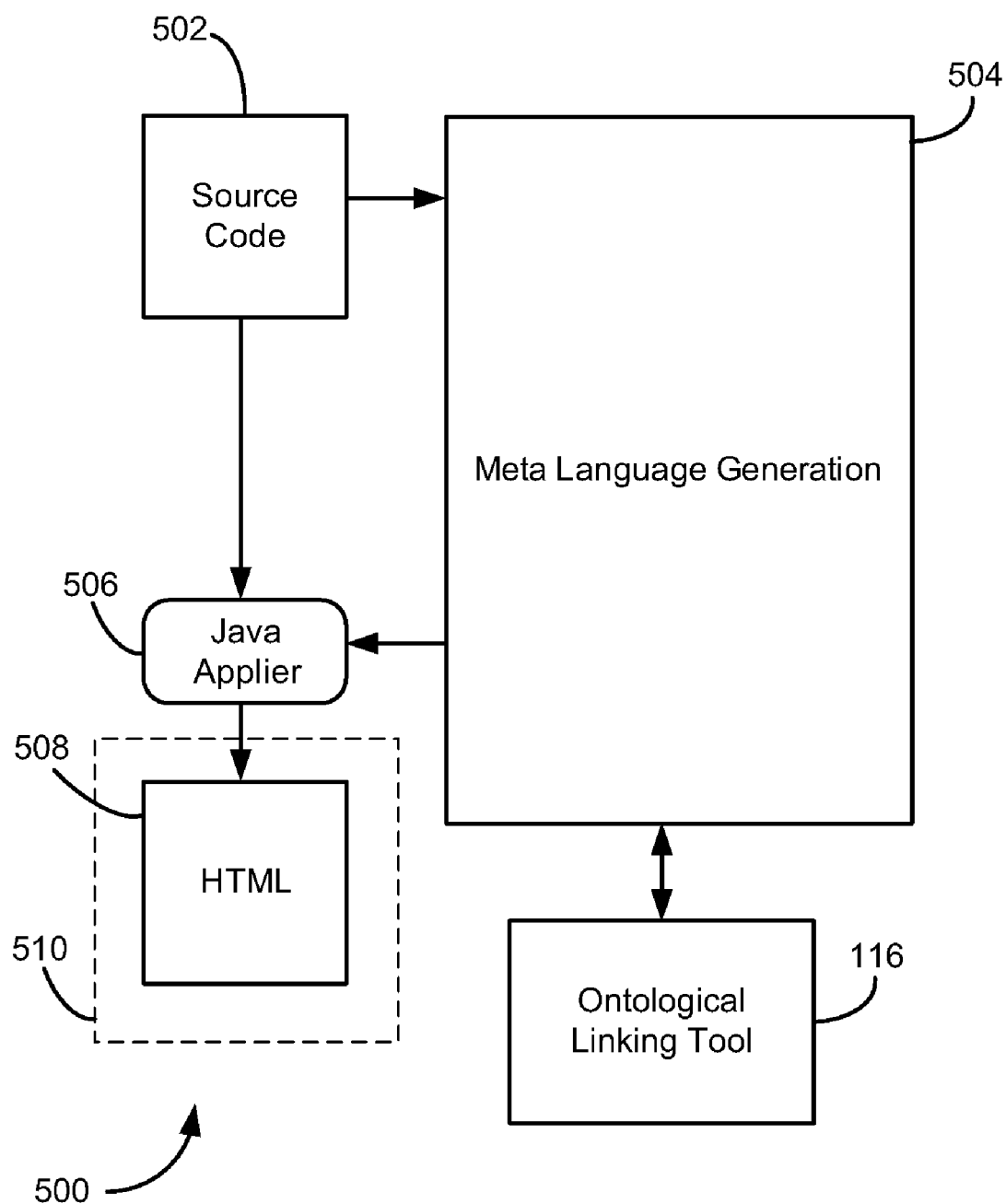
FIG. 5 is a schematic diagram of an exemplary embodiment of a meta language generation subsystem of the mechanical model extraction tool of the system of FIG. 1, which is used to create the mechanical model of FIG. 4.

FIG. 5 shows a schematic diagram of an exemplary embodiment of a source code and meta language extended Single Static Assignment (XSA) tree 500. Meta language generation engine 504 uses XSA as a programming metalanguage that can parse legacy source code 502, or native code from legacy application 102, to generate asset specific views of the original source code. Legacy source code 502 can either be derived from portions of programs 202 or may be the programs in their entirety. If more than one legacy source code 502 exists, embodiments can run a separate parsing operation for each type of legacy source code.

Referring back to FIG. 3, the mechanical fabric 300 operates as a set of models that may be created by parsing the literal structure of a legacy application 102 to generate an XSA tree 500. As an example, the legacy code can be parsed into an XSA tree 500 according to different functions of the code, and the resulting parsed code can be annotated and processed by linking the parsed code according to function and converting into a viewable format. For example, an XSA tree 500 may be transformed using extensible stylesheet language transformations (XSLT) to generate through a user interface 510 an HTML 508 linked representation of mechanical fabric 300 according to an asset specific view of the legacy code.

Some embodiments may use XSA file, line and column number information designations to annotate source code by combining XSA information with the original source code. For example, the embodiment in FIG. 5 combines the XSA information from meta language generation engine 504 with the source code 504 to generate HTML 508 representation of mechanical fabric 300. Associations can be referenced with XSLT transforms to create links between models using the same data access points 204 in mechanical fabric 300. In some embodiments, ontological linking tool 116 can process the meta-language from meta-language generation engine 504 to identify and link boundary nodes of the mechanical and semantic models.

Figure 6:
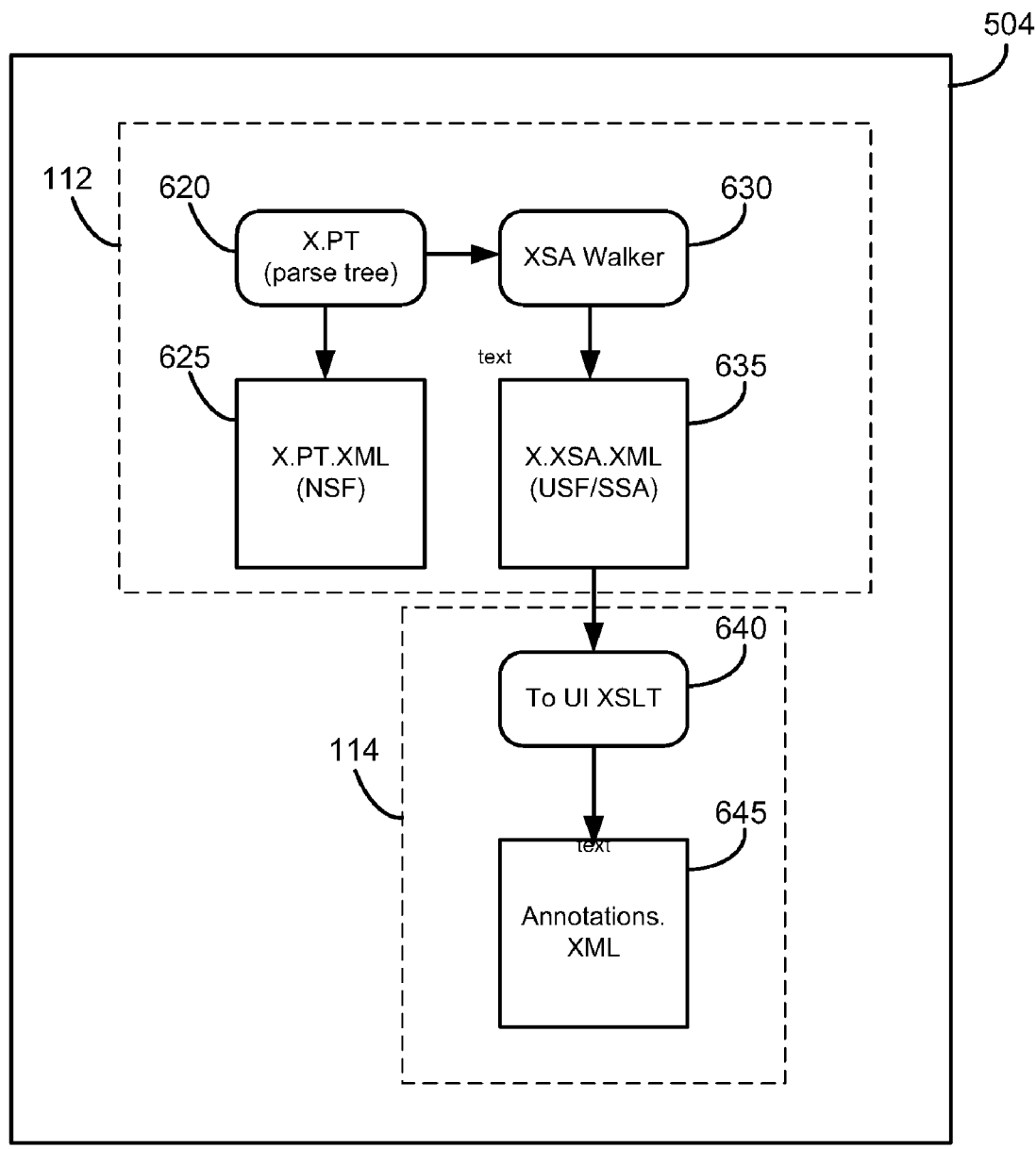
FIG. 6 is a schematic diagram of an exemplary embodiment of a meta language generation engine of the meta language generation subsystem of FIG. 5.

FIG. 6 shows a schematic diagram of an exemplary embodiment of the meta language generation engine 504 illustrated in FIG. 5 in more detail. Parse tree 620 receives legacy source code 502 and parses the literal structure of the legacy application 102 into a parse tree. In some embodiments parse tree 620 may parse the source code into an Abstract Syntax Tree (AST). XSA walker 630 then generates heuristics meta-data by walking through the parse tree and adding meta-data in the form of name value pairs based on specific data access points 204. According to the present embodiment, the heuristics meta-data is a universal syntax form (USF) such as an extended single static assignment.

XSA walker 630 outputs XSA code in block 635. Additionally, a heuristics rules list containing semantic rules can be used to attach meta-data to mechanical fabric 300 data access points 204.

In some embodiments, parse tree 620, XSA walker 630, the extensible markup language (XML) parse tree block 625 and XSA block 635 may comprise mechanical model formation tool 112. It would be understood by one of skill in the art that the functionality of mechanical model formation tool 112 may comprise other function blocks than those depicted in FIG. 6. XSA block 635 may then output to a graphical generator such as user interface XSLT block 640. UI XSLT block 640 can then use the XSA code from block 635 to generate an asset specific view of the code of legacy application 102.

Mechanical fabric 300 may contain associations between nodes representing useful relationships between the nodes. File BAR.C may be broken into nodes using XSA code 635 file, line and column number information designations according to the following example:

```
File: BAR.C
        0.........1.........2.........3
    10
    11      int fi;
    12      int fy;
    13      int of;
    14
    15      fi = fy + foo( of );
    16
    17
```

Creates the Following XSA Nodes:

```
(a)     <VarDefine id="BAR.C:11" type="int" name="fi"/>
(b)     <VarDefine id="BAR.C:12" type="int" name="fy"/>
(c)     <VarDefine id="BAR.C:13" type="int" name="of"/>
(d)     <Stmt id="BAR.C:15">
(e)         <Lvalue id="BAR.C:15:3:3">
                <VarUsage id="BAR.C:15:3:3" var="BAR.C:11"/>
            </Lvalue>
(f)         <Rvalue id="BAR.C:15:7:19">
                <Expression id="BAR.C:15:7:19">
                    <Operand id="BAR.C:15:9:9" type="+">
(g)                     <VarUsage id="BAR.C:15:7:7"
                            var="BAR.C:12"/>
(h)                     <Call id="BAR.C:15:11:18" type="function"
var="FOO.C:71">
(i)                         <Argument id="BAR.C:15:16:16"
                                var="BAR.C:13"/>
                        </Call>
                    </Operand>
                </Expression>
            </Rvalue>
        </Stmt>
```

In this example, node (a) illustrates the definition of variable "fi" as an integer, that is, <VarDefine id="BAR.C:11" type="int" name="fi"/> is XSA meta-language included within open and close marks, < and />, showing the variable located in file BAR.C at line 11 is a type "int" variable with a name "fi". Similarly, nodes (b) and (c) are nodes shown in file line and column number format definition the other integer variables "fy" and "fo" from the example code. In some embodiments, the nodes may then be associated in association, type, and class format as follows:

| Assoc. | Type | Class |
|---|---|---|
| e->a | label->variable | explicit |
| e->f | rvalue->lvalue | implicit |
| f->g | expression->label | implicit |
| f->h | expression->label | implicit |
| g->b | label->variable | explicit |
| g->e | expression->assigment | implicit |
| h->z | function_call->function | explicit |
| h->i | function_call->argument | implicit |
| i->c | label->variable | explicit |

In this association example, node (e) is associated with node (a), showing the label (e) is associated with the variable (a) and furthermore that the association is explicit. Other associations may be represented as implicit, for example in the association of node (e) to node (f), associating the variable with an expression and operand. In this example the associations are represented with unidirectional arrows, but in the mechanical fabric 300 the associations are bi-direction and can be traversed in both directions.

In some embodiments, parse tree 620 and XSA walker 630 can be extended to capture other information in the form of additional models using semantic model formation tool 114. It would be understood by one of skill in the art that the functionality of semantic model formation tool 114 may comprise other function blocks from meta language generation engine 504, such as only block 645. These models can be incorporated into mechanical fabric 300 and further linked within the XSA tree 500. Further models can be generated based on information displayed on screens, in reports, retrieved using database read and write commands, read and write system interfaces, user/security definitions, pseudo code views, as examples.

These additional models can be used as assets and a user interface 640 can be provided based on asset type. In this way, a database can create a PCA repository structure and associations within the mechanical fabric 300 can be linked, allowing a browser/user to navigate between assets based on their relations. A query engine can then use the database to create dynamic data presentation sets, and these sets can further be used to generate non-source code views representing assets of the legacy application 102.

In some embodiments, higher level semantic assets, such as use cases 404, can be captured and stored in the PCA repository structure. These semantic assets can be input into XSA walker 630 and by using the heuristics rules can distribute the meta-data through the mechanical fabric 300.

FIG. 7 is a schematic representation of a tagged sample resource description framework (RDF) file format 700. The tags are represented as underlined sections of the text in the figure. For example, tag 702 includes the text "program name", tag 704 includes the text "UseCase 170", etc. Tags are generated by analyzing assets, such as programs 202 and legacy code 502, and imbedding comments into the code to provide a reference framework for subsequent processing actions, such as those illustrated in meta-language generation engine 504, referenced above in FIG. 5 and in more detail in FIG. 6. Tags can identify elements such as fields, variables, data structures, input and output instructions, etc., to create a network of data access points 204, or nodes, that will expose the underlying logic of the system.

In some embodiments, data access points 204 may be represented as a graphic mechanical fabric 300 to expose the underlying logic and functionality of legacy application 102. As explained above, the mechanical fabric 300 is created by collecting the assets of legacy application 102, processing these assets with software tools, and storing the modified assets in a PCA repository. In some embodiments, tagging of the legacy application 102 assets is an initial mapping function used to illustrate the underlying functionality using data access points 204. The mechanical fabric 300 can then be further enhanced with corresponding elements of physical world processes. For example, mechanical fabric 300 may include collected assets from the legacy application including program source code, data definition files, job control language (JCB), shell scripts such as BASH/TSH/KSH, PERL scripts, database files, sample reports, system documentation, paper documentation, system interface specifications, etc. After the initial mapping is completed, the mechanical fabric 300 can consist of a hierarchy of SIOs 208, programs 202, data access points 204 and physical data model 206, as illustrated in FIG. 3.

FIG. 8 illustrates an exemplary embodiment physical data model. A physical data model is a representation of a database schema in a form that allows integration into mechanical fabric 300. In this example, physical data model 206 includes a file field, and field names and field types, represented in row associations. In this example, the file is titled CUST, and the first field name is titled LNAME with an associated field type of a 12-bit string. Field name STATE is associated with a 2-bit string field type and field name SSN is associated with a 9-bit number field type.

Figure 9:
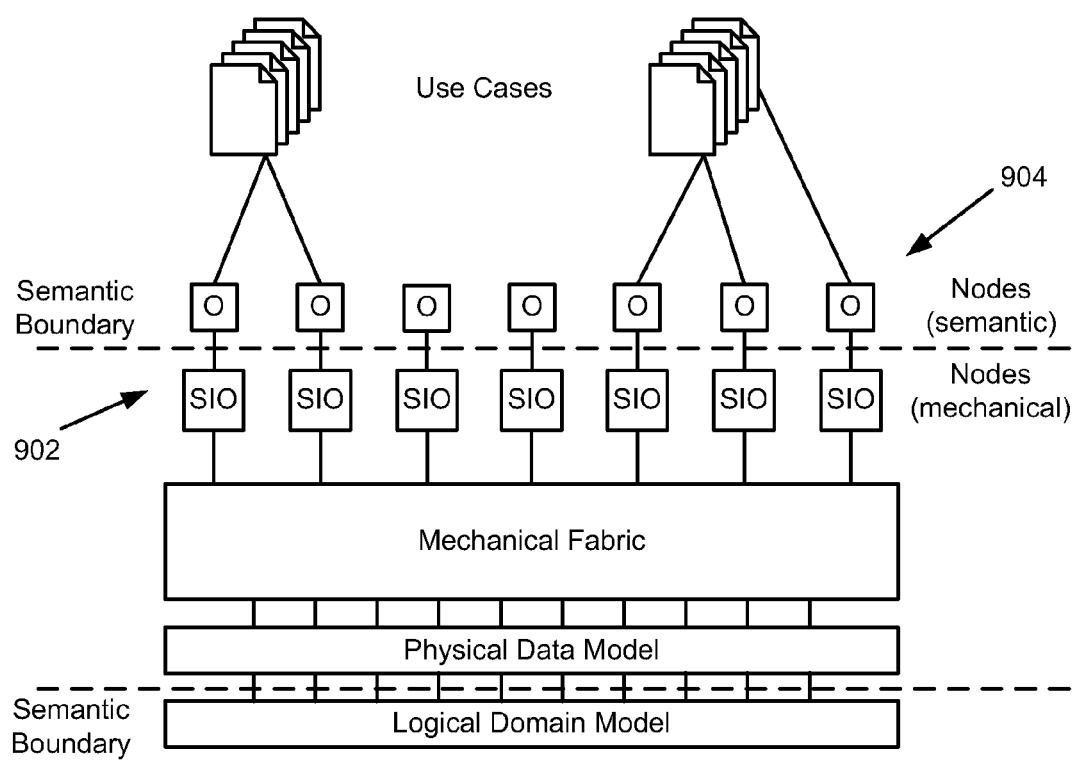
FIG. 9 is a schematic representation of the mechanical model and the semantic model linked together by the ontological linking tool of the system of FIG. 1.

FIG. 9 shows a schematic representation of the linking of the mechanical fabric with the semantic model. In the present embodiment, boundary nodes 902 in the mechanical fabric include system interface objects and boundary nodes 904 in the semantic model may include observable system interactions. A system model can then be developed by linking objects between the mechanical fabric and the semantic models to create nodes crossing the semantic boundary.

Ontological linking tool 116 links the mechanical fabric 300 with the semantic model 400, and elements of the mechanical fabric 300 and the semantic model 400 may be tagged with comprehensive identification information on an aggregate level. In this manner new methods to access and utilize the legacy application 102 information can be developed.

The ontological linking tool 116 can be configured to identify a variable on a universal level, due to the link between the mechanical fabric 300 and the semantic model 400. This universal identification can create the ability to trace a variable throughout the legacy application, and transitively recognize associations with other variables. In addition, any query, field, or entity can be tracked throughout the legacy application via the linked models. By tracking these various elements of the legacy application, business rules can be exposed and defined.

Business rules can govern how a legacy application operates. The output of the business asset extraction sub-system 104 is a collection of business rules. These business assets can be used in other tools within the transformation system to produce a new application 110.

Mechanical fabric may also be linked to physical data model 206. Logical domain model (LDM) comprises the logical containers and constructs used by legacy application 102. For example, LDM can comprise elements consisting of an invoice number, a customer number, currency, social security number or an item description, etc. These are logical concepts that define the "buckets" for the temporal data passing through them, such as a specific invoice number for a customer who purchased a particular item from the inventory. As such, these logical elements may be utilized in semantic models and include use cases and LDM as well as other semantic models. As an example, the LDM functions as the semantic backdrop for the dynamics of the data being collected, processed, stored, and accessed by the legacy application system. Once a domain model has been loaded, an embodiment system has the ability to map any variable to the domain entity, and also to its type. The combined models within a repository can be represented in a graph using a graphical user interface as explained below with reference to FIG. 10. Initial processing of a legacy code base and database extracts internalized logic of the existing system in Mechanical fabric 300.

Mechanical fabric, i.e. the code and data models, can be embedded with rich type information that allows exposure and tracing of variables. For example, a variable in a schema can be marked as containing "money". This variable can be traced throughout the entire system, transitively making all references that are assigned to, added to or subtracted from that field as type "money". Additionally, any intermediate variable can also be marked as containing the type "money"; then when showing enhanced source code, all references to "money" can be flagged as "money". Example embodiments to flag all references to money could be a generated green back group or a mouse-over pop-up message.

Figure 10:
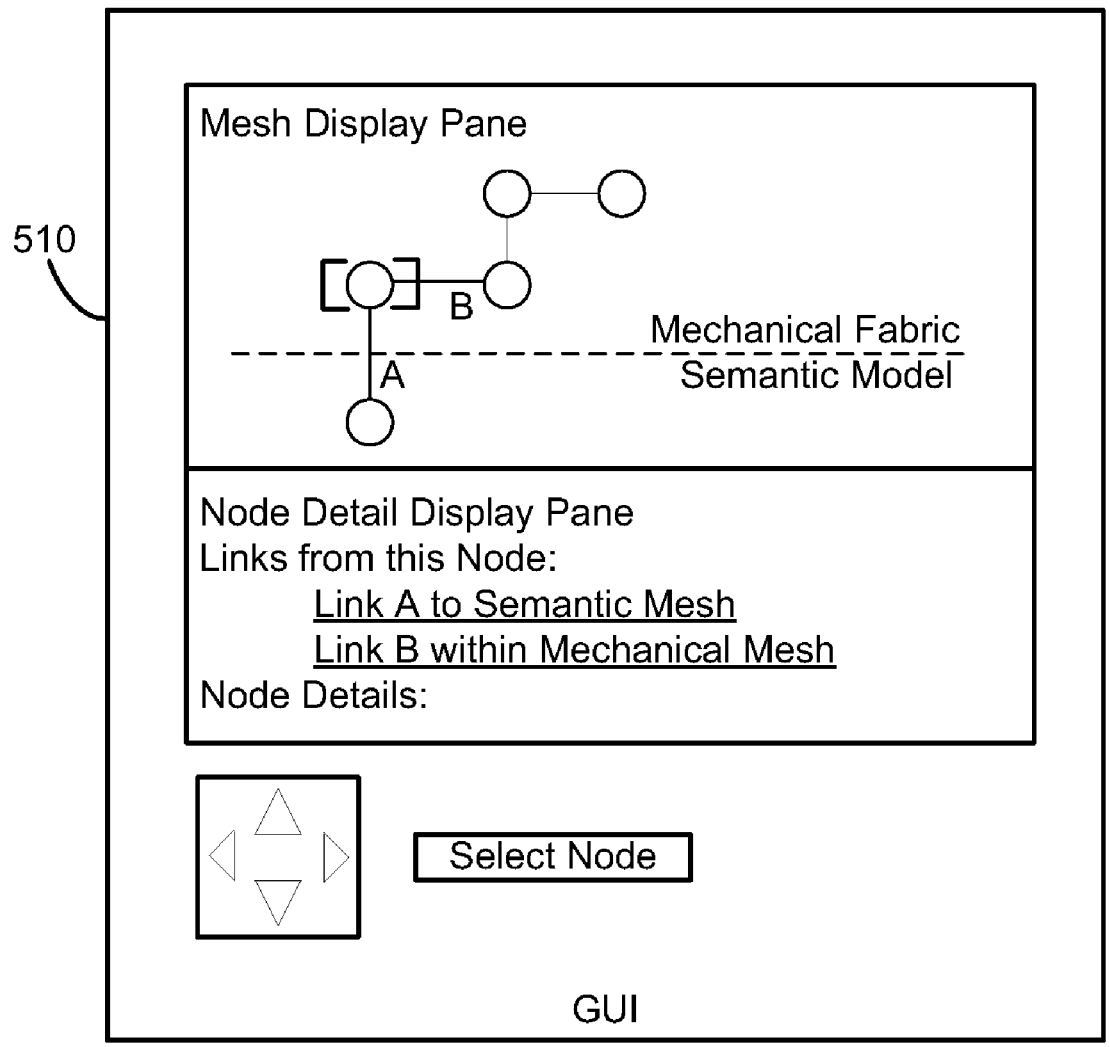
FIG. 10 is a schematic representation of a graphical user interface of the transition system of FIG. 1.

As shown in FIG. 10, graphical user interface 510 typically includes a mesh display pane configured to display a representation of the mechanical fabric and the semantic model. The representation is typically graphical, illustrating nodes and links therebetween using graphical elements such as the illustrated circles and lines. Alternatively, the mesh may be illustrated textually in the mesh display pane. In addition a dividing line between the mechanical fabric and the semantic model may be graphically or textually illustrated in the mesh display pane, and a link between linked nodes of the mechanical fabric and the semantic model may be shown crossing the dividing line. Alternatively, the dividing line may not be illustrated. While typically both the mechanical fabric and the semantic model are displayed simultaneously, it will be appreciated that the mesh display pane may be configured to simply display one of the mechanical fabric or the semantic model at a time. In addition, a node detail display pane may be provided to display detailed information about the node, such as the links extending from the node. In the illustrated example, the target node has two links, A and B, to nodes in the semantic and mechanical mesh, respectively.

The GUI in FIG. 10 further includes a first mechanism for navigating between the nodes, in the form of a user selectable direction controls (illustrated as arrows in the figures), and a select node selector. Pressing the arrows in various directions controls the selection of the target node (indicated in brackets), and pressing the select node selector causes the node information for the target node to be displayed in the node detail display pane. The node detail display pane includes a second mechanism for navigating between the nodes, in the form of underlined links to the nodes connected to the target node. Either the first or second mechanisms for node traversal may be used to traverse a link crossing between the mechanical fabric and semantic model, to allow the user easy access to the information contained in both meshes.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding, two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A software transformation system executed on one or more computing devices and configured to transform a legacy computer application into a new computer application, the software transformation system comprising:
   a business asset extraction sub-system configured to receive as input data representing the legacy computer application, the business asset extraction sub-system comprising:
      a mechanical model formation tool configured to:
         scan the legacy computer application to identify mechanical assets of the legacy computer application, including one or more of system interface objects, computer programs, data access points, and a physical data model configured to store data records utilized by the legacy computer application;
         parse the legacy computer application into identifiable segments; and
         during the parsing, tag mechanical assets of the legacy computer application with associated meta language identifier information;
         assign mechanical nodes to the tagged mechanical assets based on the meta language identifier information;
         linking the mechanical nodes to create a mechanical fabric representing computer-implemented operations of the legacy computer application;
         wherein the mechanical fabric includes a network of mechanical nodes, each mechanical node being placed at a tagged mechanical asset, and associations between the mechanical nodes;
      a semantic model formation tool configured to:
         identify as semantic assets a plurality of steps of a use case of a business process according to which a user interacts with the legacy computer application, the steps including one or more observable system interactions during which the user interacts with respective system interface objects of the mechanical fabric;
         parse the semantic assets; and
         during the parsing, tag each semantic asset with associated meta language identifier information;
         assign semantic nodes to the tagged semantic assets based on the associated meta language identifier information;
         linking the semantic asset nodes to create a semantic model representing operator-perceived meanings attached to interactions with the legacy application, wherein the semantic model includes a network of semantic nodes, each semantic node being placed at a tagged semantic asset, and associations between the semantic nodes;
      an ontological linking tool configured to create links between related mechanical nodes and semantic nodes, based on the meta language identifier information associated with each of the mechanical nodes and semantic nodes, at least some of the links being between mechanical nodes that represent system interface objects and semantic nodes that represent observable system interactions with corresponding system interface objects; and
      an asset-specific graphical generator to generate a graphical view of the links identified by the ontological linking tool as being between related mechanical nodes created by the mechanical model formation tool and semantic nodes created by the semantic model formation tool;
   a modernization and streamlining sub-system configured to process output of the business asset extraction sub-system to remove obsolete business rules from the collection of business rules to produce a collection of relevant business rules; and
   a model and standards development sub-system configured to process output of the modernization and streamlining sub-system to output a new computer application based on the collection of relevant business rules.

2. The software transformation system of claim 1, wherein the mechanical fabric is generated using a programming meta-language generator.

3. The software transformation system of claim 2, wherein the meta-language generator includes an extended single static assignment (XSA) generator.

4. The software transformation system of claim 1, wherein the graphical generator includes an extensible stylesheet language transformation (XSLT) generator.

5. The software transformation system of claim 1, wherein the graphical view is linked in HTML format, and is configured to be navigated by a user via a browser.

6. A software transformation system executed on one or more computing devices and configured to transform a legacy computer application into a new computer application, the software transformation system comprising:
   a computer-executable transformation program including:
      a user interface configured to display at least a portion of a mechanical fabric and a semantic model of a legacy computer application generated by an asset-specific graphical generator to generate a graphical view of links between related mechanical nodes within the mechanical fabric and semantic nodes included in the semantic model, the user interface including controls for navigating to the mechanical nodes within the mechanical fabric and to the semantic nodes within semantic model, and for navigating between the mechanical nodes within the mechanical fabric and the semantic nodes within the semantic model along the links formed therebetween, the controls being configured to enable selection of at least one of the mechanical and semantic nodes to display information about that selected node which exposes one or more business rules that govern operation of the legacy computer application, where the mechanical nodes and the links between related mechanical nodes represent one or more of a system interface object, a computer program, a data access point, and a physical data model configured to store data records utilized by the legacy computer application;

a modernization and streamlining sub-system configured to receive a collection of business rules identified through the selection of the mechanical and semantic nodes via the user interface and process the collection of business rules to remove obsolete business rules and thereby produce a collection of relevant business rules; and a model and standards development sub-system configured to process output of the modernization and streamlining sub-system to produce and output a new computer application based on the collection of relevant business rules.

7. The software transformation system of claim 6, wherein the links are represented in HTML format.

8. A computer-executable transformation program executed on one or more computing devices, comprising:

a mechanical fabric data architecture configured to represent a legacy computer application, the mechanical fabric comprising:
   a plurality of mechanical nodes interlinked by associations between the mechanical nodes, wherein respective mechanical nodes are configured to represent:
      a portion of code within a computer program;
      a system interface object implemented by the computer program:
      data stored within a physical data model; and
      data access points interlinking the computer program and the physical data model;

a semantic model data architecture configured to represent operator-perceived meanings attached to human interactions with the legacy computer application, the semantic model comprising:
   a plurality of semantic nodes interlinked by associations between the semantic nodes, wherein respective semantic nodes are configured to represent:
      at least one business process of an enterprise;
      use cases for each discrete task within the business process;
      observable system interactions with the legacy application, by which operators interact with the legacy computer application, the observable system interactions being associatable with one or more of the use cases;
      the legacy application; and
      a logical domain model representing operator-perceived data processed by the legacy application; and a user interface configured to display at least a portion of a semantic fabric of the legacy computer application generated by an asset-specific graphical generator to generate a graphical view of links between related semantic nodes and the mechanical nodes, the user interface including controls for navigating to semantic nodes within the semantic model and to mechanical nodes in the mechanical model, and for navigating between the mechanical nodes and associated semantic nodes along the links formed therebetween, the controls being configured to enable selection of at least one of the semantic and mechanical nodes to display information about that selected node which exposes one or more business rules that govern operation of the legacy computer application.

9. A method of transforming a legacy computer application into a new computer application, the method being executable by one or more computing devices, comprising:

receiving the legacy computer application to be transformed at the one or more computer devices;

parsing the legacy computer application to identify mechanical assets of the legacy computer application, the mechanical assets including computer programs, system interface objects of the computer programs via which human operators interact with the computer programs, a physical data model representing stored data within the legacy application, and data access points through which the computer programs access the data stored in the physical data model;

tagging the mechanical assets with semantic tags;

creating mechanical nodes from the tagged mechanical assets;

identifying semantic assets representing human interaction with the legacy computer application, the semantic assets including business processes, use cases of the business processes, and observable system interactions corresponding to the use cases;

tagging the semantic assets with semantic tags;

creating semantic nodes from the tagged semantic assets;

linking the mechanical nodes to create a mechanical fabric representing computer-implemented operations of the legacy computer application and linking the semantic nodes to create a semantic model representing the human interaction with the legacy computer application, wherein mechanical nodes and semantic nodes having corresponding semantic tags are linked;

presenting a graphical user interface including controls for navigating to the mechanical nodes within the mechanical fabric and to the semantic nodes within semantic model, and for navigating between the mechanical nodes and the semantic nodes along the links formed therebetween, the controls being configured to enable selection of at least one of the mechanical and semantic nodes to display information about that selected node that exposes one or more business rules that govern operation of the legacy computer application;

identifying a collection of business rules that govern operation of the legacy computing application from the mechanical fabric and the semantic model, based on user input received via the graphical user interface;

removing obsolete business rules from the collection of business rules to produce a collection of relevant business rules; and producing and outputting the new computer application based on the collection of relevant business rules identified from the mechanical fabric and the semantic model of the legacy computer application.

10. The method of claim 9, wherein the semantic tags represent at least one of a field, variable, data structure, and input and output instruction category.

11. The method of claim 9, wherein the semantic tags are generated using resource description framework (RDF) file format.

* * * * *